Jan. 30, 1962  J. D. HELBIG  3,018,759
POULTRY HOUSING

Filed May 5, 1960  8 Sheets-Sheet 1

INVENTOR.
JIM D. HELBIG
BY Bertha L. MacGregor
ATTORNEY

Jan. 30, 1962   J. D. HELBIG   3,018,759
POULTRY HOUSING
Filed May 5, 1960   8 Sheets-Sheet 2

INVENTOR.
JIM D. HELBIG
BY Bertha L. MacGregor
ATTORNEY

INVENTOR.
JIM D. HELBIG

INVENTOR.
JIM D. HELBIG
BY Bertha L. MacGregor
ATTORNEY

Jan. 30, 1962  J. D. HELBIG  3,018,759
POULTRY HOUSING

Filed May 5, 1960  8 Sheets-Sheet 5

INVENTOR.
JIM D. HELBIG
BY Bertha L. Mac Gregor
ATTORNEY

Jan. 30, 1962  J. D. HELBIG  3,018,759
POULTRY HOUSING
Filed May 5, 1960  8 Sheets-Sheet 6
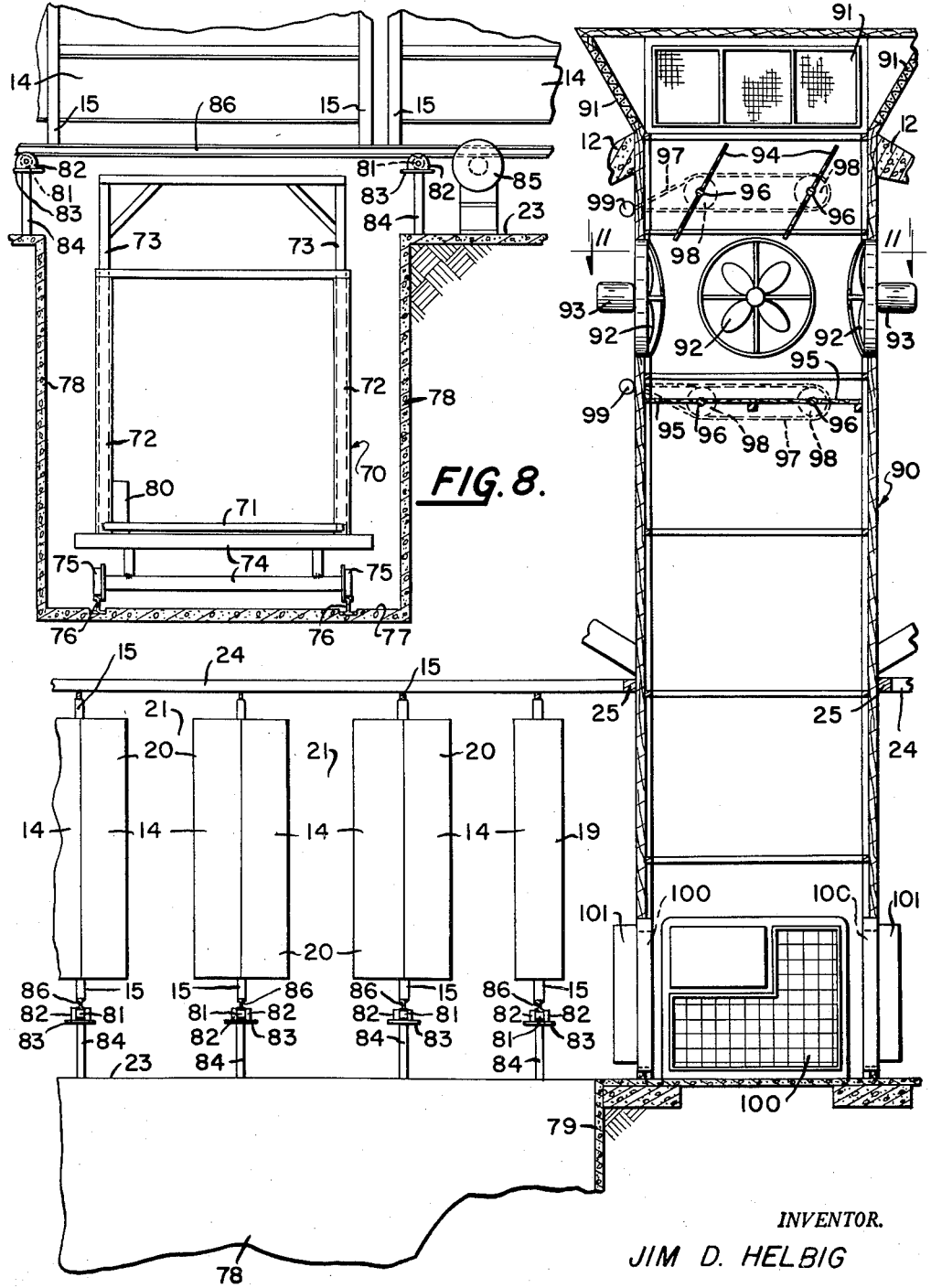
INVENTOR.
JIM D. HELBIG
BY Bertha L. MacGregor
ATTORNEY INVENTOR.
JIM D. HELBIG
BY Bertha L. MacGregor
ATTORNEY Jan. 30, 1962    J. D. HELBIG    3,018,759
POULTRY HOUSING Filed May 5, 1960    8 Sheets-Sheet 8

INVENTOR.
JIM D. HELBIG
BY Bertha L. MacGregor
ATTORNEY

3,018,759
POULTRY HOUSING

Jim D. Helbig, Arvada, Colo., assignor, by mesne assignments, to Gates Cyclo International, Inc., Denver, Colo., a corporation of Colorado
Filed May 5, 1960, Ser. No. 27,112
21 Claims. (Cl. 119—21)

This application is a continuation-in-part of my application Serial No. 831,341, filed August 3, 1959, for Poultry Housing. This invention relates particularly to poultry housing for individually caged birds which provides for complete management of the housed poultry, regardless of number, including feeding, watering, cage cleansing and egg collection and includes means for providing fresh temperature-controlled air, by simple and efficient means, within minimum space.

Cages are arranged in tiers, and tiers of cages are connected together in concentric, annular rows, spaced apart radially to provide annular aisles between facing rows. The concentric annular rows of tiers of cages are mounted to rotate about a single axis. The annular rows may be continuous, and in that embodiment I provide a sunken, radially extending service chamber or area beneath the cages. The annular rows may have ends spaced apart from each other, and in that embodiment the rows of tiers of cages are rotated to bring the spaces between the ends into radial alignment to provide a radially extending service area which may be on the same level as the floor of the building or on a different level.

The annular rows of tiers of cages are rotated to move past a movable service unit which carries food, water and cage cleansing brushes to the several rows of cages as they pass the service area, or the rows of tiers of cages may be moved past stationary food and water containers and cleansing brushes located in the annular aisles, at different levels to accommodate the superposed cages of the tiers.

The building which embodies my invention preferably is circular in horizontal cross section, although it may be octagonal or other shape. If square, the corners can be used for purposes other than poultry housing. An important feature of the building is a central structure referred to herein as a tower which houses air conditioning and circulating apparatus including fans facing in four directions, dampers and refrigerating mechanism.

Poultry housing has been provided with ventilating means, as well as so called air conditioning systems, but it has not been practical or economically feasible to provide conventional poultry housing with complete air circulating and conditioning means including temperature control, due to the high cost of the equipment and operation, per bird, in prior art structures. For economical operation of such equipment it is necessary to concentrate the cages, to greatly reduce the cubic area of the housing per bird, and to so locate the air conditioning apparatus that every cage will be uniformly supplied with conditioned, temperature controlled air. I have achieved this purpose by greatly increasing the cage capacity of my housing as compared to prior art structures of the same cubic space, by the form and location of my air conditioning apparatus and by rotating the cages continuously in annular paths which traverse the streams of conditioned air. To indicate the marked degree of cage concentration, I may mention that housing embodying my invention, 56 feet in diameter, efficiently houses 5500 birds in individual cages; if 100 feet in diameter, it efficiently houses 25,000 birds in such cages.

The temperature of indoor air is affected to a major degree by indoor and outdoor temperature exchange through side and overhead walls. Floor surfaces are not a major factor in this respect. Therefore the capacity of air conditioning apparatus must be related to the surface area of the side and overhead walls. Conventional housing now in use, as well as that shown in prior art patents, requires an average of 5 sq. ft. of such wall area per bird. The housing of my invention requires less than 1 sq. ft. of side and overhead wall surface per bird.

Efficient air conditioning apparatus must supply fresh air and remove heat which enters by heat exchange through the side and overhead walls of the structure, as well as the heat generated by the birds. The shapes of such prior art structures and/or the cage arrangement therein prevents the uniform circulation of temperature controlled air to every cage in the building. The existing objections have been overcome by the construction and apparatus hereinafter more fully described.

To service the large numbers of birds housed in the structure described herein, I have provided a movable service unit such as shown in FIGS. 3 to 6, inclusive, adapted to be moved in the service area provided between radially aligned spaces between the ends of annular rows of tiers of cages such as shown in FIG. 2, to supply food, water, cleansing brushes, and to support an operator for egg collection. Another form of service unit is shown in FIGS. 8 and 9, movable in a radial direction in a sunken service area provided beneath the cages. In the embodiment shown in FIGS. 7–12, inc., the food and water containers and the brushes for cleansing droppings pans are mounted on stationary supports in the aisles at different levels to accommodate the cages of the tiers of cages constituting each annular row.

An important feature of the service unit shown in FIGS. 3–6, inc. resides in the elimination of waste drainage facilities heretofore associated with individual cages and tiers of cages. The service unit is provided with drainage facilities to which the cages are moved for cleansing purposes as they travel in their concentric paths across the service area. Droppings beneath each cage and the water required for cleansing the pans thus are made to pass into the single drainage facilities of the service unit and from there to a drain or drains located in the floor of the service area. This feature of my invention saves the cost of hundreds of individual cage waste drainage facilities, and confines the cleansing operation entirely to the radially extending service area.

Food and water may be supplied to the poultry from the service unit by placing same in cage troughs as the cages are moved in annular paths past the service unit, or food and water stations may be located near the sides of the service area in positions accessible to the poultry for self-feeding while the cages are moving slowly past said stations. It has been found that this type of short but frequent intermittent feedings, resulting when cages are moved continuously past stationary food and water stations accessible to the poultry, promotes the health and egg laying capacity of the poultry and is preferable to larger feedings at greater time intervals.

It has been proposed heretofore to arrange tiers of cages in a single concentric group around a central vertical axis and to rotate the grouped cages around said axis for the purpose of moving the cages past a feeding station. Several of said groups of cages, each group rotatable about its own vertical axis, different from the axes of the other groups, have been arranged around such a central feeding station. However, it is apparent that such prior art constructions are necessarily limited as to the number of cages, and require much more space than is needed for the housing of this invention, and the central feeding station can serve only the limited number of groups of cages which can be located concentrically around one station, each rotated about its own axis into positions accessible to the station.

The supporting of all the annular rows of cages above the surface of the building floor facilities cleansing of the floor and introduction of conditioned air to be circulated around the cages.

In the drawings:

FIG. 7 is a vertical sectional view, partly in elevation and diagrammatic, of another embodiment of my invention, showing the central tower and air conditioning apparatus therein, in a plane extending through the tower radially toward a side of the structure.

FIG. 8 is a vertical sectional view of a portion of the housing of FIG. 7, showing the sunken radially extending service area, in the plane of the broken line 8—8 of FIG. 9.

Figure 1:
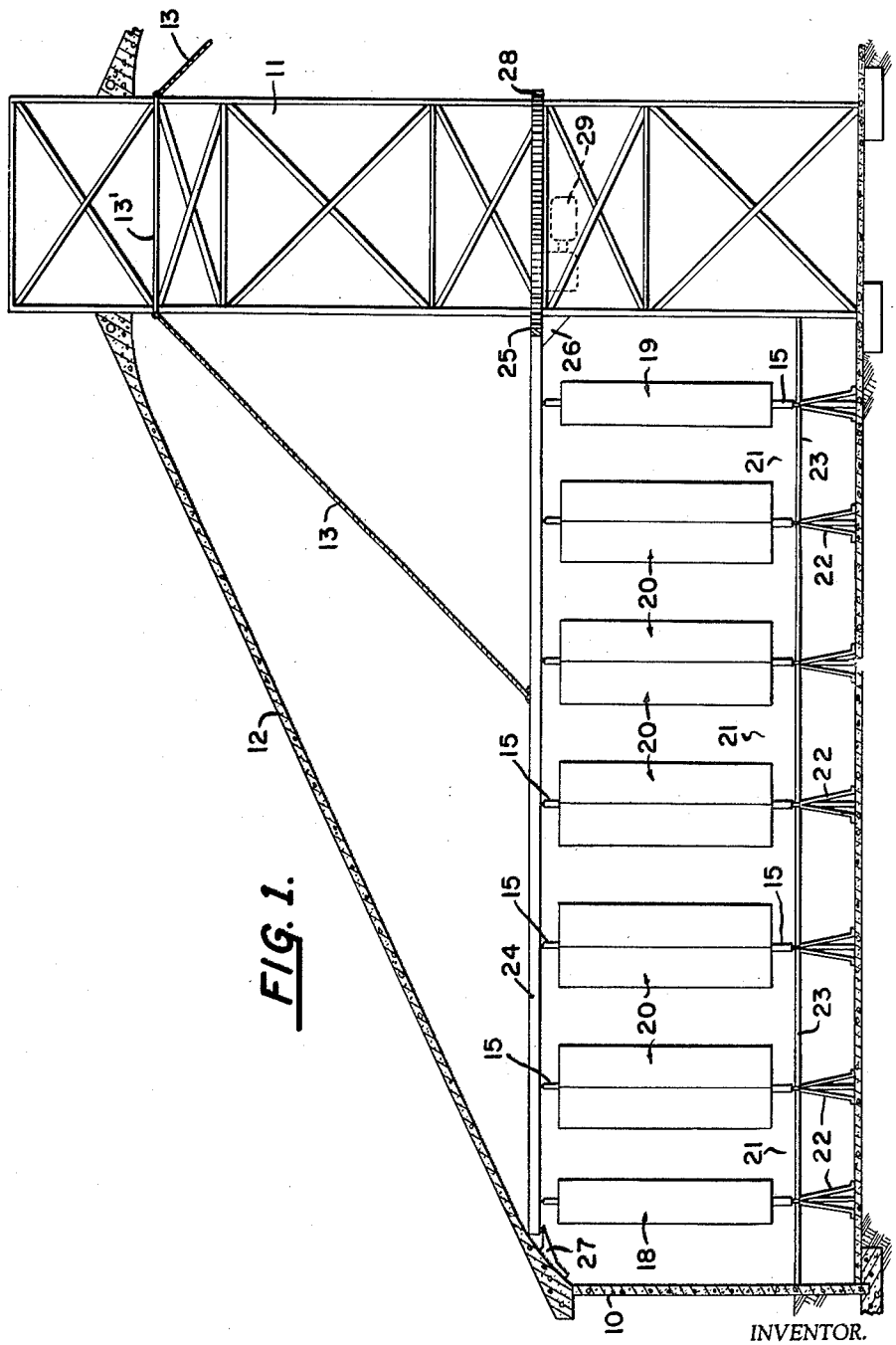
FIG. 1 is a vertical sectional view of one embodiment of my invention, in a plane extending through the central tower radially to the exterior wall of one side of the structure.
Figure 2:
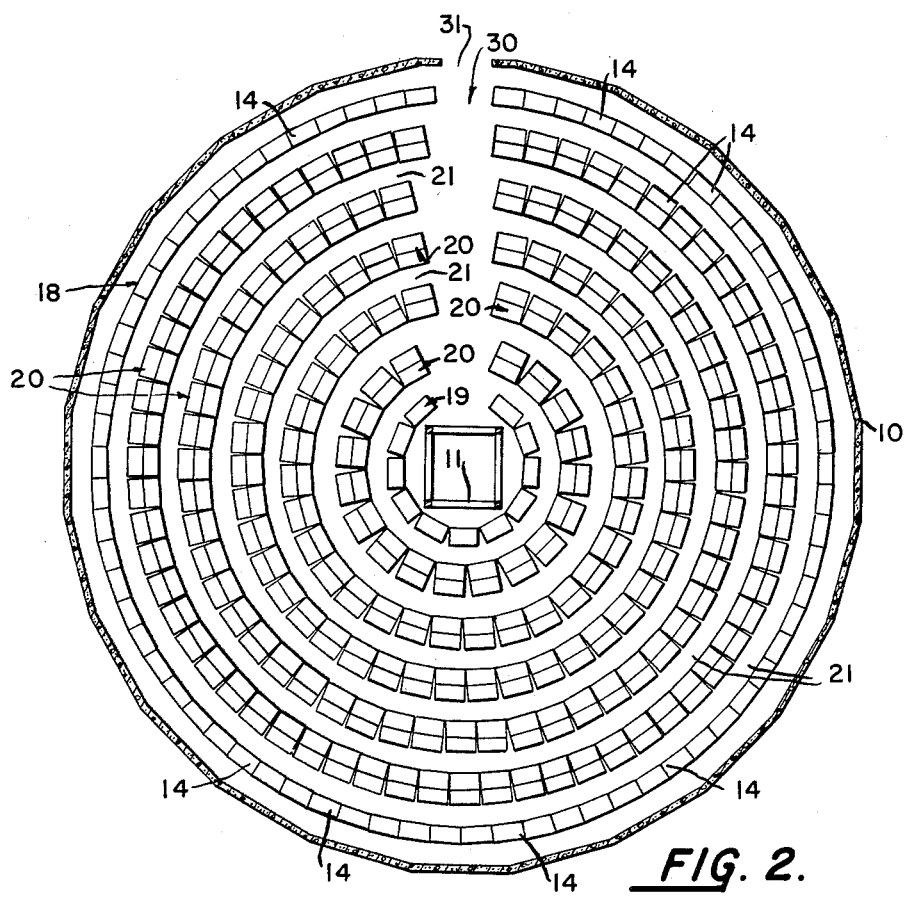
FIG. 2 is a diagrammatic horizontal sectional view of the poultry housing of FIG. 1, taken in a plane extending through the tiers of cages, with details of construction omitted.
Figure 6:
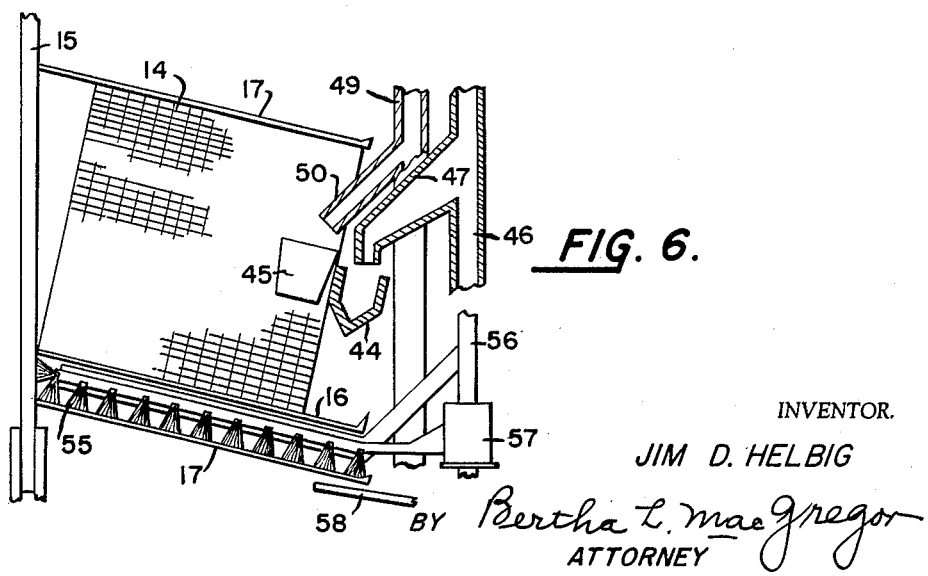
FIG. 6 is a vertical sectional view on an enlarged scale of part of the service unit, showing the food and water spouts, droppings pan cleansing brush and waste receiving gutter carried by the service unit in juxtaposition to a cage.

In that embodiment of the invention shown in FIGS. 1 to 6, inclusive, poultry cages are located in a building substantially circular in horizontal cross section, as indicated at 10 in FIG. 2, provided with a central tower 11, and a conical roof 12 supported by the tower 11 and walls 10, as shown in FIG. 1. The tower 11 may be of metal construction, capable of supporting numerous annular rows of tiers of cages, as by cables 13 connected to a rotatable ring 13' on tower 11, and provided with means for rotating the cages as will be explained hereinafter.

Figure 3:
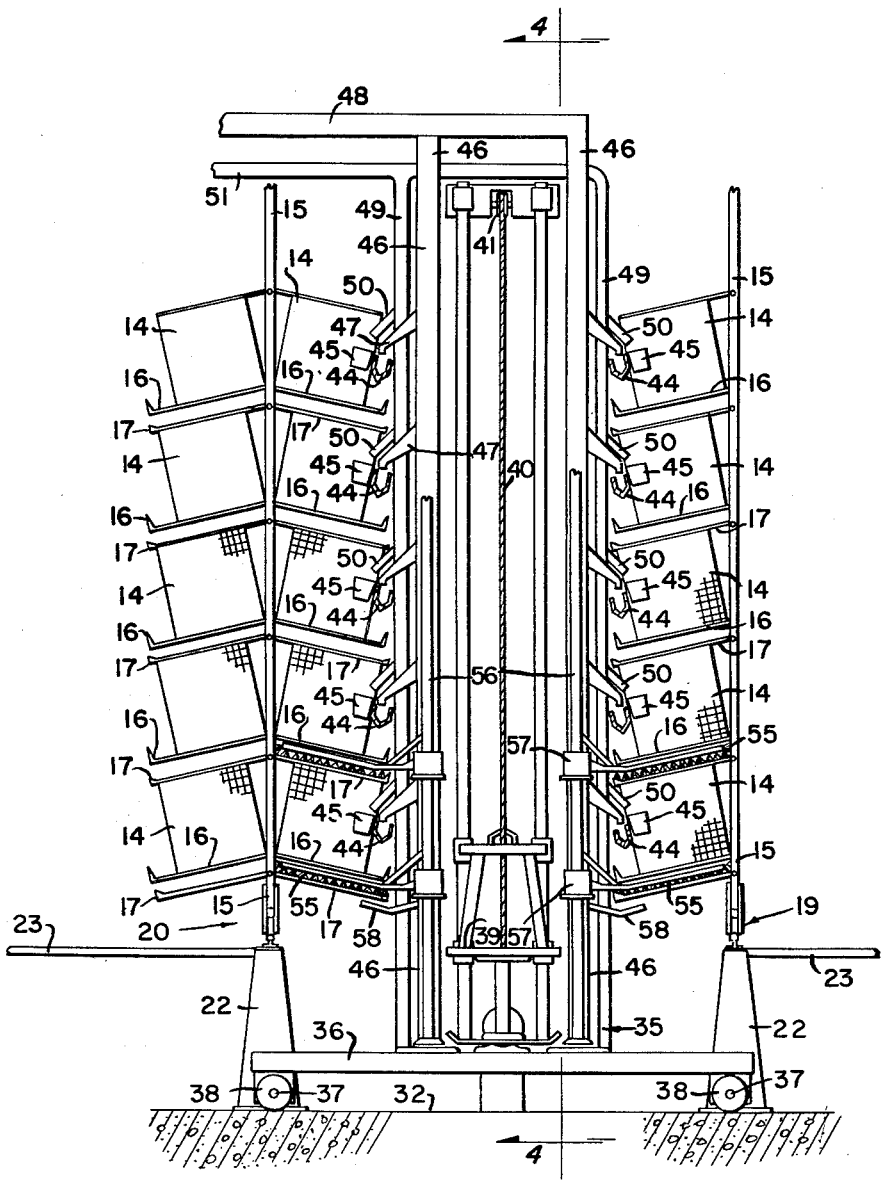
FIG. 3 is a vertical elevational view of the ends of parts of two rows of tiers of cages such as shown in FIG. 2, and a vertical sectional view of a service unit located in the service area in annular alignment with the aisle between the two rows of tiers of cages.

As shown in FIG. 3, cages 14 each designed to house one bird, are arranged in tiers, one above the other, the cages of each tier being supported by an upright post 15. The cages 14 are tilted so that their floors 16 and droppings pans 17 are inclined downwardly from rear to front. A number of tiers of cages are arranged in annular rows as shown in FIG. 2, the outermost row 18 and innermost row 19 consisting of single cage tiers, and the intermediate annular rows 20 consisting of double cage tiers. The left hand side of FIG. 3 shows one of the double cage tiers 20 and the right hand side of the figure shows one of the single cage tiers, such as 19. It will be understood that an annular row 20 has cages 14 facing in opposite directions, with their backs toward each other. The arrangement is such that the annular rows 18, 19, 20 are concentric relatively to each other, and concentric aisles 21 are provided between the front faces of tiers of cages.

The posts 15 which support the cages of the double rows 20 and the cages of the single rows 18, 19, are supported at their lower ends on tracks on blocks 22 located beneath the floor 23 of the building, and at their upper ends in radially extending beams 24 as shown in FIG. 1. Said beams 24 are connected at their inner ends to a ring gear 25, supported by the tower 11 and bracket 26, the outer ends of the beams 24 being movable on a circular track 27 connected to the roof 12 adjacent the building wall 10. The gear 25 meshes with the teeth of a gear 28 mounted on the tower 11 to rotate about a vertical axis. A motor and gearing 29 for driving the gear 25 is also mounted on the tower 11. As shown, all of the annular rows of tiers of cages are connected to radial beams 24 and are rotated as a unit, but obviously means may be provided for rotating each row independently of the others.

It will be understood that in FIG. 1, the annular rows of cages 18, 19 and 20 are shown diagrammatically, and that the cages 14 of the tiers constituting said rows are arranged as shown in FIG. 3.

Each of the rows 18, 19, 20 has ends spaced from each other, and when the said spaces are aligned as shown in FIG. 2, there is provided a service area 30 between the ends of the several rows, extending radially from the innermost row 19 of cages to the outermost row 18 and building wall opening 31. As shown in FIG. 3, the floor 32 of the service area 30 is lower than the floor 23 of the rest of the building.

Figure 4:
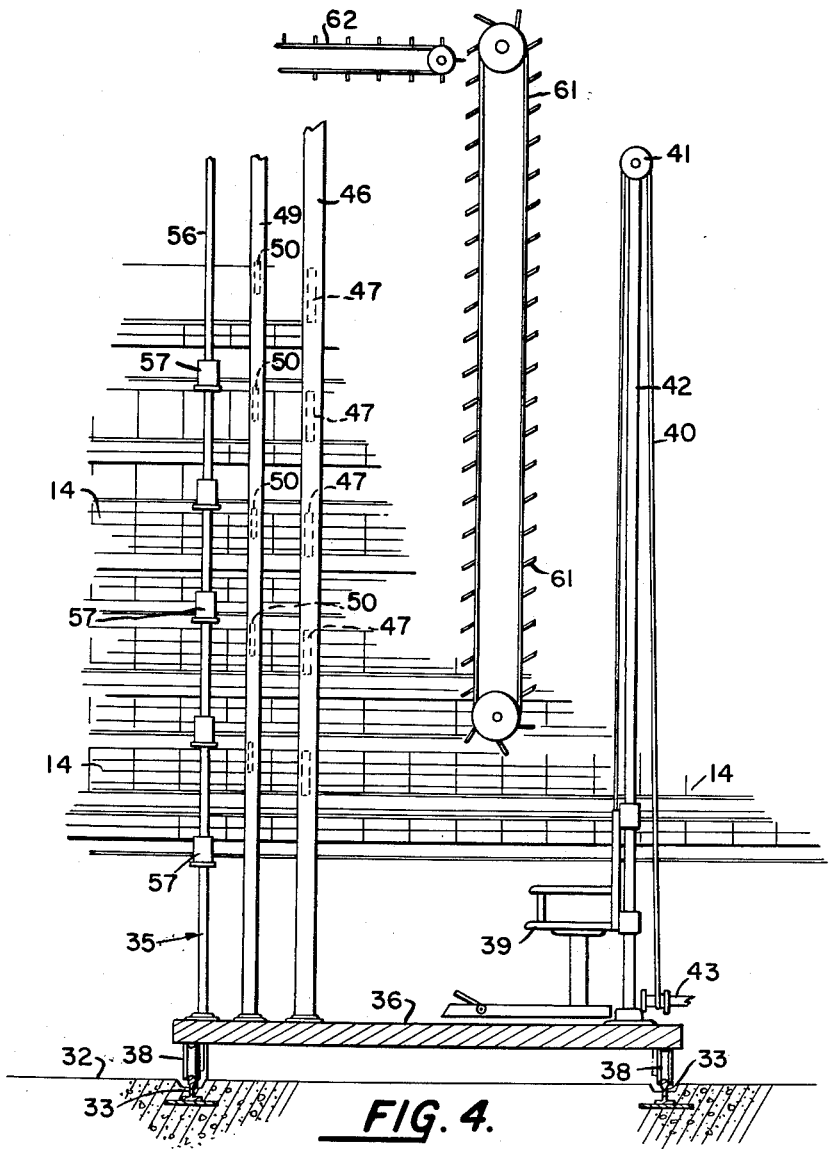
FIG. 4 is a vertical sectional view taken in the plane of the line 4—4 of FIG. 3, showing the service unit partly in elevation at right angles to the position of FIG. 3, in juxtaposition to the face of part of a row of tiers of cages.

The service area floor 32 is provided with a pair of tracks 33, parallel to each other as shown in FIG. 4, extending from the tower 11 to near the wall 10 of the building. The tracks 33 support the service unit indicated as a whole at 35, best shown in FIGS. 3 and 4. The base 36 of the unit 35 rests on a pair of wheel axles 37 each provided with wheels 38 which move on the tracks 33. An operator's chair 39 is mounted on the base 36. The chair may be raised and lowered by any suitable means, such as the cable 40 trained over pulley 41 rotatably mounted on post 42, the cable being attached to the chair 39 and crank 43 rotated by motor (not shown).

The service unit 35 includes means for delivering food and water to the food troughs 44 and water containers 45 in the cages 14. At each side of the operator's chair the service unit is provided with a food pipe 46 having a delivery spout 47, the lower ends of the pipes 46 being supported on the base 36 and the upper ends communicating with a food supply through a supply pipe 48 which may be flexible and of sufficient length to permit the service unit 35 to move in the service area for its intended purposes. Also provided at each side of the unit is a water pipe 49 having a delivery spout 50, the lower ends of the pipes 49 being supported on the base 36 and the upper ends communicating with a water supply through a supply pipe 51 which also may be flexible and of sufficient length to permit the service unit 35 to move in the service area 30. The food and water spouts 47 and 50 at opposite sides of the service unit 35 are located and proportioned so that they deliver food and water to the parts 44, 45 of the facing cages of two rows of tiers of cages when the service unit is located in annular alignment with an aisle 21 between said rows, and the rows of cages are rotated to move them past the service unit. The spouts 47 and 50 are designed to supply food and water to the superposed cages of each tier simultaneously.

Figure 5:
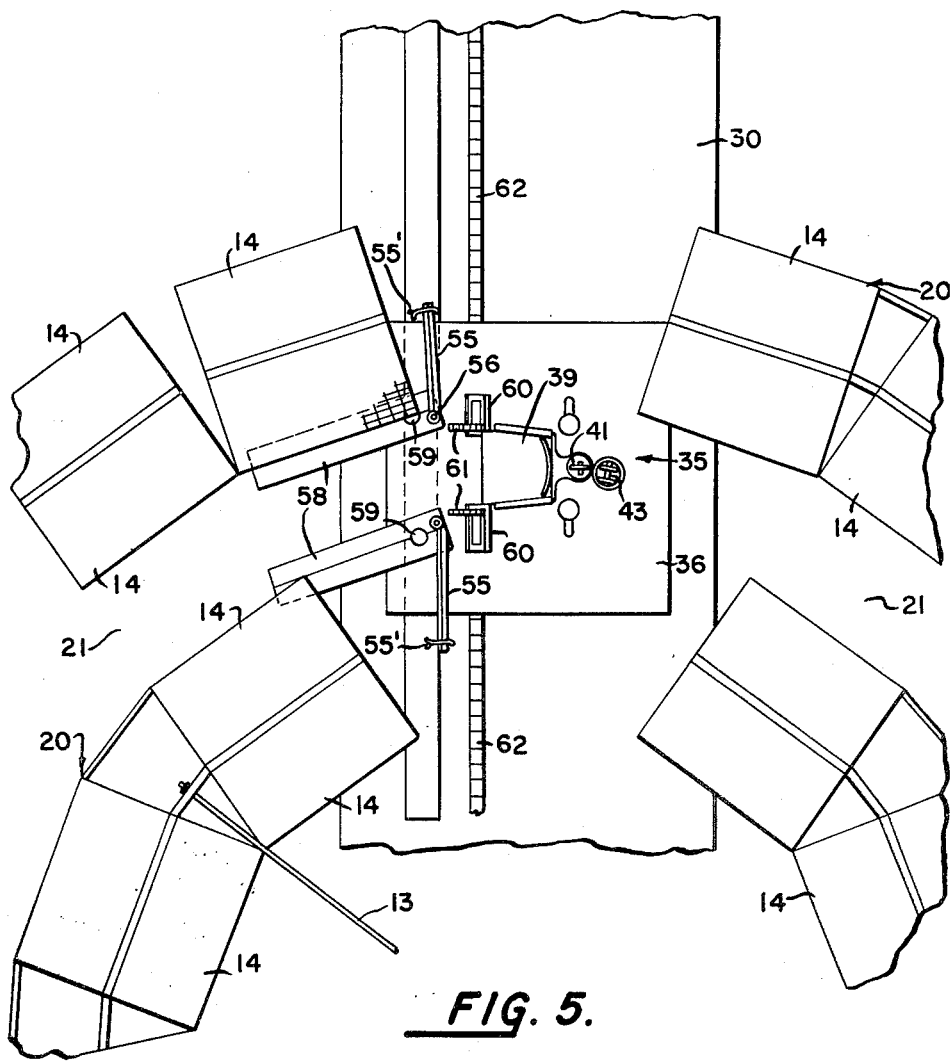
FIG. 5 is a plan view, on an enlarged scale, showing the tops of the spaced apart ends of two annular rows of tiers of cages and showing the service unit located in the service area in the position of FIG. 3.

The service unit 35 also is provided with means for cleansing the droppings pans 17 beneath the cages 14. Said means comprises a pair of oppositely extending brushes 55 having hollow bristle carrying elongated bodies through which water is supplied to the brushes. Each brush 55 is mounted on a water supply pipe 56 in communication with the interior of the supply pipe as indicated by the joint 57. As shown in FIGS. 3 and 5, the brushes 55 extend from the service unit in opposite directions, in a generally horizontal plane but slightly inclined upwardly to conform to the inclination of the droppings pans 17 beneath the cages constituting the tiers of cages. The brushes are provided at their free ends with pan cleaning means indicated at 55'. As best shown in FIG. 5, the brushes 55 enter the spaces between the cage floors 16 and droppings pans 17 when the rows of cages are rotated to move past the service unit. To receive the waste material including the wash water from the droppings pans 17, there are provided gutters 58 which are positioned relatively to the service unit 35 by which they are carried so as to underlie the forward edges of facing cages 14 as the rows of cages are rotated to move them past the service unit. The waste material flows from the gutters through drains 59 from whence it is carried off by any suitable means in the floor 32 of the service area 30.

Eggs laid by the poultry naturally roll down to the front edges of the floors 16. The service unit 35 is provided with pairs of swingingly mounted egg trays 60 (FIG. 5) which receive the eggs at proper levels from the floors 16 of the cages 14 when the cages are moved past the service unit. Egg conveyor means, such as shown in FIG. 4 at 61, 62, carry the eggs to a suitable receiver (not shown).

Thus it will be understood that all the services required in the management of poultry are performed by the use of a single service unit which is movable in a generally radial direction to positions in the service area 30 in alignment with aisles 21 where all the cages of the tiers of cages facing an aisle 21 are accessible to the service unit 35 as the facing rows are rotated and moved past the service unit. Instead of requiring separate waste drains leading from each cage and each tier of cages, a single drain pipe 59 at each side of the service unit 35 together with gutters 58 for each cage of a pair of tiers of cages receives all the waste material from the cages. A single food supply pipe and a single water supply pipe simultaneously supplies food and water to a tier of cages, and successively supplies food and water to following tiers of cages. Likewise, brushes equal in number to the cages of a tier, connected to a water line mounted on the service unit, are operated simultaneously to cleanse droppings pans of the entire tier, and are operated successively as a group to cleanse following tiers of cages as the rows of cages are rotated past the service unit.

Figure 9:
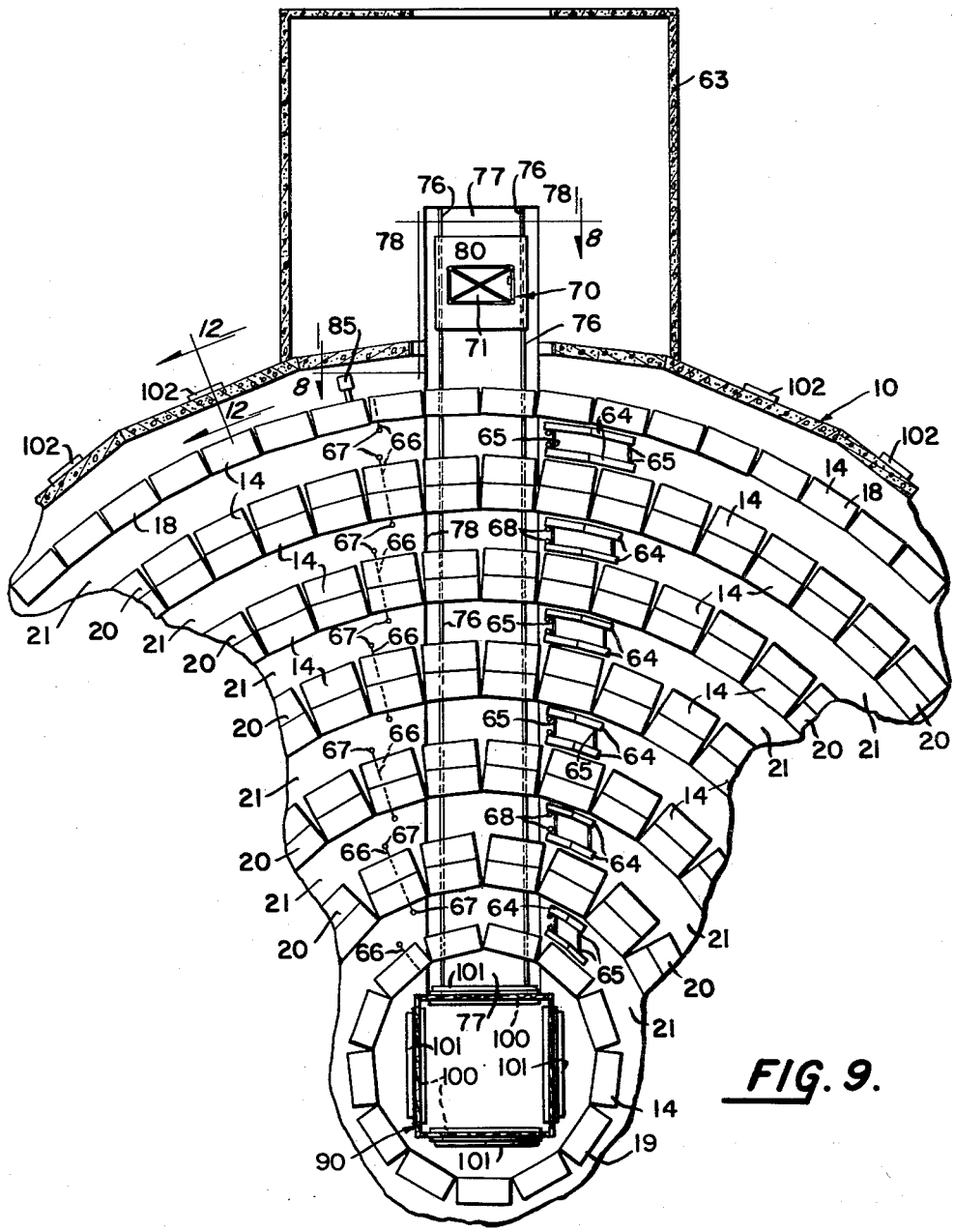
FIG. 9 is a diagrammatic horizontal sectional view of part of the housing of FIG. 7, with details of construction omitted.

Referring to the embodiment of my invention shown in FIGS. 7 to 12, inclusive, the building 10 heretofore described communicates with an auxiliary service building 63 adjacent one side. The cages 14 are identical with those previously described, provided with bottoms 16 and droppings pans 17, and are mounted in tiers on posts 15. The tiers are arranged in annular concentric rows such as designated 18, 19 and 20, but as shown in FIG. 9, the annular rows of tiers of cages are continuous as distinguished from the similarly designated rows in FIG. 2, where the rows have spaced apart ends.

Figures 10, 12:
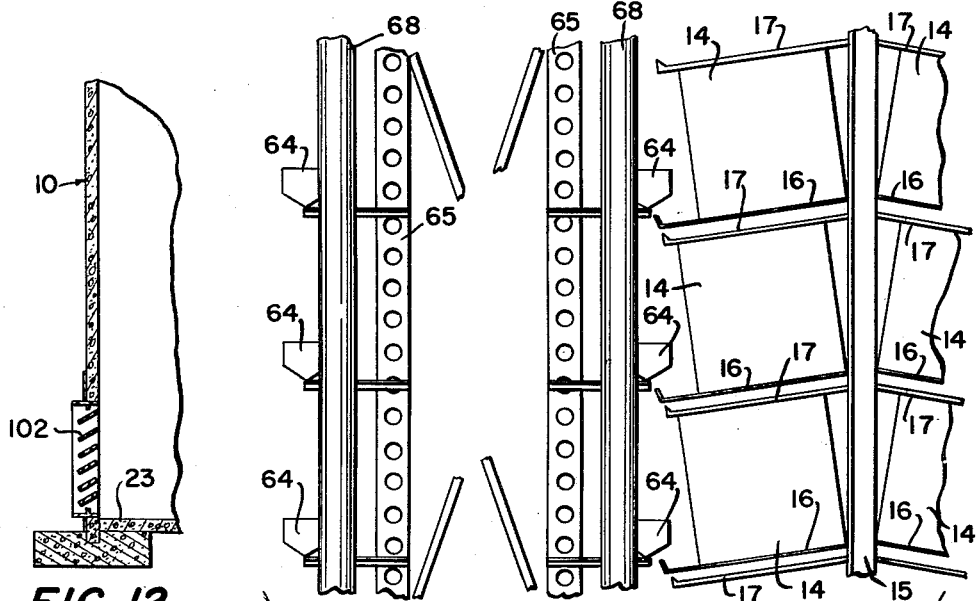
FIG. 10 is a vertical elevational view of part of a tier of cages and of stationary feeding stations located in an annular aisle between facing rows of tiers of cages.
FIG. 12 is a vertical sectional view through a louvered portion of the exterior wall of the structure, in the plane of the line 12—12 in FIG. 9.

Located in the annular aisles 21 between the rows of tiers of cages are stationary food and water containers 64, one adjacent the face of each annular row of cages. The containers 64 are mounted on upright supports 65 as shown in FIG. 10, at different levels, to serve the cages which constitute each tier of cages as the rows of tiers are rotated past the feeding station. As shown in FIG. 9, the containers 64 are arcuate longitudinally to conform to the annular form of the rows of cages, the containers being graduated as to length so that the longest containers are located adjacent the outermost row 18 and facing row 20, and the shortest containers are located adjacent the innermost row 19 and facing row 20. By this arrangement of different sized feeding stations and by regulating the speed of rotation of the rows of tiers of cages, each bird is given proper opportunity to eat and drink during each rotation of the row of cages. Pipes 68 supply water to the containers 62 which are divided to receive food in one part and water in the other.

In FIG. 9, stationarily mounted brushes 66 on supports 67 located in the aisles 21 are located at different levels to extend into the spaces between cage bottoms and dropping pans 17 as the rows of cages are rotated, thereby cleansing the pans by pushing the droppings off the pans into a receiver.

When stationary feeding stations and brushes are employed, as shown in FIGS. 9 and 10, I provide a service unit for egg collection, indicated at 70 as a whole in FIGS. 8 and 9. It comprises a platform 71 and tubular side members 72 telescopically mounted on upright frame members 73. The frame members are mounted on a base with axles 74 provided with wheels 75 adapted to travel on tracks 76 in the floor 77 of a sunken service area defined by side walls 78 beneath the annular rows of tiers of cages in the main building. The service area floor 77 extends radially from the inner wall 79 near the center tower to the side of the building 10 and into the communicating auxiliary building 63 as shown in FIGS. 7 and 9. The platform 71 which supports the operator may be raised or lowered by any suitable means such as the hydraulic means indicated diagrammatically at 80. The floor 77 is sufficiently lower than the bottom of the cages and their supports on the floor 23 to accommodate the service unit 70 and an operator standing on the platform 71 so that the unit can pass beneath rows of tiers of cages. The platform can be elevated to enter the aisles 21 between the continuous rows, as desired.

Any suitable means may be employed for rotating the annular rows of tiers of cages as previously explained with respect to FIGS. 1-6, inc. In FIG. 7, I have shown other means, wherein the lower ends of the cage supporting posts 15 are connected to an annular rail 86. Rollers 81, rotatable on a horizontal axis, are mounted between blocks 82 on plates 83 fixed on posts 84. The rail 86 rests on and is slidable on rollers 81. A motor or motors 85 shown in FIG. 8 is provided with means for driving the annular rail 86 to rotate the rows of tiers of cages.

Figure 11:
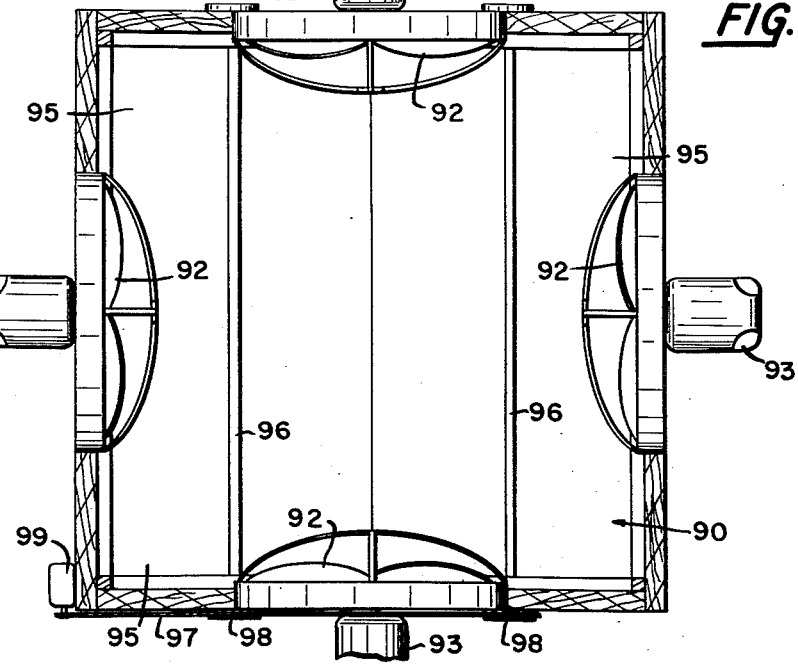
FIG. 11 is a horizontal sectional view, on an enlarged scale, in the plane of the line 11—11 of FIG. 7.

Referring to FIG. 7, ductless air conditioning and circulating apparatus is located in the central tower 90. The tower is hollow, square in cross section, as shown in FIG. 9, the walls extending from the floor 23 to above the roof 12. The upper end of the tower is provided with air intake openings 91, properly screened. Near the upper end of the tower but within the poultry housing proper, four fans 92 are mounted in the tower walls as shown in FIGS. 7 and 11, to force air outwardly from the tower in four paths 90° apart. Fan motors are indicated at 93. Above the fans are dampers 94 shown in open positions and below the fans are dampers 95 shown in closed positions in FIG. 7. The dampers are mounted on horizontal shafts 96 and are actuated to open, closed or intermediate positions by manually or automatically thermally controlled means including the chains 97, sprockets 98 on shafts 96 and operators 99. In the lower part of the tower, refrigerating coils 100 are located opposite air intake openings 101, preferably four in number. Condensers and compressors are located outside of the building as is customary.

Preferred temperature for my poultry housing is 55° F. When outdoor temperature is higher than the preferred indoor temperature, the upper dampers 94 are almost completely closed and louvers 102 (FIGS. 9 and 12) in the peripheral side walls of the building 10 also are almost completely closed. Approximately 10% of fresh air is allowed to enter from the intakes 91 to provide oxygen. The room air supplemented by the limited intake of fresh air is recirculated by the fans 92, forced out over the cages, down through the aisles, around and through the cages, downwardly to beneath the cages, to the base of the tower 90, into the intakes 101, through the refrigerating coils 100, and up through the tower to the fans.

When the outdoor temperature is the same as the preferred housing temperature, the refrigeration means is cut off, dampers 94 above the fans are opened completely, dampers 95 below the fans are closed completely and louvers 102 are opened. All air is taken in through the openings 91 in the top of the tower and sent out by the fans over the cages. After having been filtered by means (not shown), air leaves the building through the louvers 102.

When outdoor temperatures are less than the preferred housing temperature, both sets of dampers 94, 95 are partially open and refrigeration open and refrigeration cut off. The damper openings are controlled to mix cold air admitted through the tower openings 91 with warm recirculated air coming up through the tower from the intakes 101, so that the air sent out by the fans over the cages will be the preferred temperature.

The air streams produced by the fans pass above the cages and are deflected by the overhead wall surfaces to pass downwardly in diffused condition, so that the birds are not subjected to drafts.

As previously pointed out, due to the concentrated cage arrangement in my poultry housing, and the minimum space employed for service area, less than 1 sq. ft. of side and overhead wall surfaces of the building is required for each bird. This is contrasted with the 4 to 5 sq. ft. of such surface of conventional buildings required for each bird. The difference in cost of air conditioning apparatus and operation is illustrated by the following example: Assume the preferred temperature of the housing is 55° F. If 1″ standard insulation has been used in the building construction, there is a heat transfer of about 12.5 B.t.u. per hour per square foot of side and overhead wall surfaces from the outside to the inside of the building. A bird gives off 40 B.t.u. per hour. Thus, in the poultry housing of my invention, it is necessary to eliminate 52.5 or approximately 50 B.t.u. per bird per hour in order to maintain the preferred temperature of 55° F. In using conventional prior art housing, where an average of 5 sq. ft. of side and overhead wall surface is required per bird, the heat transfer is $5 \times 12.5$ B.t.u. or 62.5 B.t.u. Add to this the 40 B.t.u. given off by a bird. Thus, in conventional housing, it is necessary to eliminate 62.5 plus 40, a total of 102.5 B.t.u. per bird, per hour, in order to maintain the preferred temperature.

Not only does the operation of air conditioning apparatus in conventional poultry housing cost more than twice as much as mine, per bird, but the initial cost of the apparatus and installation is four to five times as great due to the fact that greater capacity is required for circulating conditioned air through such houses, most of which are rectangular and relatively long in one dimension. Another expense factor is that such buildings require ducts to convey air to all parts of the buildings, which I avoid due to the shape of my poultry housing and the fact that the annular rows of tiers of cages are constantly rotated about a single axis. There is no possibility of any cage or tier of cages being located in a "dead" air zone, as is unavoidable in housing wherein the cages are stationary, or are arranged in separate groups each rotatable about a different axis. In my air conditioning system, the radially directed streams of conditioned air spread out somewhat after they leave the fans 92 and the air streams become diffused before or when they reach the side walls 10, but as is the case in the operation of all known air conditioning systems, some non-uniformity as to quality, velocity and/or temperature may exist in the air of the room as a whole. Such non-uniformity, if any, as may exist in the air does not affect the birds in my poultry housing for the reason that all the birds are regularly and constantly moved through all segments of air in the building by the rotation of the annular rows about a single axis, and thus are uniformly treated to conditioned air.

It will be understood of course that the air conditioning apparatus located in the tower 90 of the poultry housing shown in FIGS. 7 and 9 is equally applicable to the housing shown in FIGS. 1 and 2, which differ from each other only in respect to the details of the service areas and service units. In both embodiments of my invention, the concentrated arrangement of the tiers of cages in a plurality of concentric annular rows rotatable about a single axis, together with the enclosure of the cage-containing area by confining side and overhead walls, in combination with the means for circulating temperature-controlled conditioned air, and the rotation of the annular rows of tiers of cages through all of the segments of air in the room, whether uniformly conditioned or not, make the operation of this invention economically practical and highly efficient. No birds are caged in a "dead" air area; all birds are treated uniformly to conditioned air.

The efficiency of the housing and the good health of the birds therein is evidenced by the egg laying capacity of the birds which is 86% as compared to the national average of 55% (the calculation is based on the standard 1 egg per bird per day=100%).

Although I have shown a central tower square in cross section, with a fan located in each of the four walls, obviously the tower could be hexagonal or octagonal in cross section and a fan could be mounted in each of the walls. Further, the air conditioning means, the service area, and/or the service units described in connection with one embodiment of the invention may be employed in the other embodiment of the invention as shown in the drawings. These and other changes may be made without departing from the scope of the invention as defined by the appended claims.

I claim:

1. Poultry housing comprising a building, a plurality of tiers of cages connected together in annular rows to form a plurality of annular rows, the plurality of said rows of tiers of cages having different diameters and being located concentrically relatively to each other and to a single axis, said annular rows being spaced apart radially to provide annular aisles between facing rows, means movably supporting said rows of tiers of cages, means rotating said annular rows of tiers of cages in different concentric paths about said single axis, a service area comprising a floor extending radially from the innermost to the outermost annular row of tiers of cages, and a service unit movable radially of the housing and longitudinally of said service area into aisle positions from which all the cages of facing rows of tiers of cages are accessible to said unit when the plurality of rows of tiers of cages are rotated across said service area.

2. The poultry housing defined by claim 1, in which the radially extending service area has a radially continuous floor located in a plane below the bottoms of the lowermost cages of the tiers of cages, and the service unit is movable longitudinally of said service area beneath the cages, said service unit including a movable support for an operator.

3. Poultry housing comprising a building, a plurality of tiers of cages connected together in annular rows to form a plurality of annular rows, the plurality of said rows of tiers of cages having different diameters and being located concentrically relatively to each other and to a single axis, said annular rows being spaced apart radially to provide annular aisles between facing rows, means movably supporting said rows of tiers of cages, means rotating said annular rows of tiers of cages in different concentric paths about said single axis, and food and water containers mounted at different horizontal levels in each aisle accessible to the birds in cages of the adjacent annular row of tiers of cages while the cages are moved past the containers.

4. The poultry housing defined by claim 3, in which the food and water containers located in each annular aisle differ in length from the containers located in adjacent aisles, said food and water containers being uniformly proportional to the concentric dimensions of the adjacent annular rows of tiers of cages.

5. Poultry housing comprising a building having a floor, side walls and an overhead wall, a plurality of tiers of cages connected together in annular rows to form a plurality of annular rows, the plurality of said rows of tiers of cages having different diameters and being located concentrically relatively to each other and to a single axis, said annular rows being spaced apart radially to provide annular aisles between facing rows, means movably supporting said rows of tiers of cages, air circulating means centrally located in the building coincident with said single axis of the plurality of annular rows circulating air from the center toward the side walls in radial streams, and means rotating the annular rows of tiers of cages about said single axis and repeatedly moving said cages of the plurality of annular rows in annular paths traversing said air streams, whereby all birds in the cages are uniformly treated to circulated air from said air circulating means.

6. The poultry housing defined by claim 5, in which the side and overhead walls have a surface area equal to less than one square foot for each cage in the building.

7. Poultry housing comprising a building substantially circular in horizontal cross section and having a floor, side and overhead walls, air conditioning means comprising a centrally located hollow tower in the building between the floor and overhead wall, an air intake opening in the tower communicating with the atmosphere, air intake openings in the tower communicating with the interior of the building, means in the tower controlling the intake of air, air outlets in the side walls, temperature varying means in the tower, and means forcing air out of the tower in streams moving in radial directions toward the side walls, a plurality of tiers of cages connected together in a plurality of annular rows of different diameters concentric about a single axis coincident with said tower, said rows being separated by annular aisles between facing cages, said rows and aisles occupying substantially all the space in the room between the tower and side walls, and means rotating the annular rows of tiers of cages about said single axis and repeatedly moving said cages in annular paths traversing said air streams, whereby all birds in the cages of the plurality of annular rows are uniformly treated to conditioned air circulated from said air conditioning means.

8. Poultry housing comprising a building having a floor, side walls and conical overhead wall, air conditioning means comprising a centrally located hollow tower in the building between the floor and overhead wall, an air intake opening in the upper end of the tower communicating with the atmosphere, air intake openings in the lower end of the tower communicating with the interior of the building, refrigeration means adjacent said last mentioned openings, a plurality of fans mounted in the tower forcing air in divergent streams toward the side walls, dampers mounted in the tower above and below said fans, means for controlling the positions of said dampers, and air outlets in the side walls, a plurality of cages connected together in a plurality of annular rows of different diameters concentric about a single axis coincident with said tower, and means rotating the annular rows of tiers of cages about said single axis and repeatedly moving said cages in annular paths traversing said air streams, whereby all birds in the cages of the plurality of annular rows are uniformly treated to conditioned air circulated from said air conditioning means.

9. Poultry housing comprising a building, a plurality of tiers of cages connected together in annular rows, a plurality of said annular rows of tiers of cages having different diameters and being located concentrically relatively to each other and to a single axis, and spaced apart radially in the building, each cage being provided with a food and a water container, means supporting said annular rows of cages, means moving said annular rows of cages in different concentric paths about a single axis, a continuous service area comprising a floor extending from the innermost to the outermost annular row of cages, and a service unit located in said service area movable to positions in the area from which all the cages are accessible to said unit when said cages are moved in annular paths across said service area, the service unit being provided with a food delivery pipe having a plurality of spouts located in different horizontal planes, and with a water delivering pipe having a plurality of spouts located in different horizontal planes, the food and water containers in each cage being located in receiving positions relatively to the food and water delivery spouts of the service unit when tiers of cages are moved across the service area past the service unit.

10. Poultry housing comprising a building, a plurality of tiers of cages connected together in annular rows, a plurality of said annular rows of tiers of cages having different diameters and being located concentrically relatively to each other and to a single axis, and spaced apart radially in the building, each cage being provided with a droppings pan having a waste outlet, means supporting said annular rows of cages, means moving said annular rows of cages in different concentric paths about a single axis, a continuous service area comprising a floor extending from the innermost to the outermost annular row of cages, and a service unit located in said service area movable to positions in the area from which all the cages are accessible to said unit when said cages are moved in annular paths across said service area, the service unit being provided with a waste receiving pipe and a plurality of gutters communicating with the pipe, each gutter being located in waste receiving position relatively to the waste outlet of a droppings pan when tiers of cages are moved across the service area past the service unit.

11. Poultry housing comprising a building, a plurality of tiers of cages connected together in annular rows, a plurality of said annular rows of tiers of cages having different diameters and being located concentrically relatively to each other and to a single axis, and spaced apart radially in the building, each cage being provided with a droppings pan, means supporting said annular rows of cages, means moving said annular rows of cages in different concentric paths about a single axis, a continuous service area comprising a floor extending from the innermost to the outermost annular row of cages, and a service unit located in said service area movable to positions in the area from which all the cages are accessible to said unit when said cages are moved in annular paths across said service area, the service unit being provided with a water pipe and a plurality of brushes communicating with the pipe at different levels, each brush being located to enter a droppings pan in pan cleaning position when tiers of cages are moved across the service area past the service unit.

12. Poultry housing comprising a building, a plurality of tiers of cages connected together in annular rows, a plurality of said annular rows of tiers of cages having different diameters and being located concentrically relatively to each other and to a single axis, and spaced apart radially in the building, means supporting said annular rows of cages, means moving said annular rows of cages in different concentric paths about a single axis, a continuous service area comprising a floor extending from the innermost to the outermost annular row of cages, and a service unit located in said service area movable to positions in the area from which all the cages are accessible to said unit when said cages are moved in annular paths across said service area, the service unit being provided with egg collection trays at different levels convenient to the levels of the floors of the cages of a tier, and a conveyor adjacent said trays for receiving eggs from the trays at different levels.

13. Poultry housing comprising a building, a plurality of cages connected together in annular rows, a plurality of said annular rows of cages having different diameters and being located concentrically relatively to each other and spaced apart radially in the building, each of said annular rows having ends spaced from each other, means supporting said cages, means moving said annular rows of cages in different concentric paths about a single axis, the spaces between the ends of the annular rows of cages when aligned radially forming a continuous service area extending from the innermost annular row to the outermost annular row of cages, a service unit located in said service area movable to positions in the area from which all the cages are accessible to said unit when said rows of cages are moved in annular paths across said service area, a food and a water container in each cage, and a food delivering spout and a water delivering spout mounted on the service unit, said food and water containers in each cage being located in receiving positions relatively to the food and water delivery spouts of the service unit when the rows of cages are moved across the service area past the service unit.

14. The poultry housing defined by claim 13, in which each cage is provided with a droppings pan having a waste outlet, and the service unit is provided with a waste receiving pipe and a gutter communicating with the pipe and located in waste receiving position relatively to the waste outlet of a droppings pan when the cages are moved across the service area past the service unit.

15. The poultry housing defined by claim 13, in which each cage is provided with a droppings pan and the service unit is provided with a brush mounted on the unit to enter a droppings pan in pan cleaning position when rows of cages are moved across the service area past the service unit.

16. Poultry housing comprising a building having a floor, a central tower in the building, a plurality of cages connected together in annular rows, a plurality of said annular rows of cages having different diameters and being located concentrically relatively to each other and spaced apart radially in the building, means connecting the rows of cages to the tower in spaced relation to the floor, radially extending beams connected to the cages of the several rows, a gear on the tower, a ring gear connected to the inner ends of the beams meshing with the gear on the tower, means driving one of said gears to rotate the rows of cages about a single axis, a service area comprising a floor extending radially from the innermost to the outermost annular row of cages, and a service unit located in said service area movable to positions in the area from which all the cages are accessible to said unit when said rows of cages are moved in annular paths across said service area.

17. Poultry housing comprising a building, a plurality of tiers of cages connected together in annular rows, a plurality of said annular rows of tiers of cages having different diameters and being located concentrically relatively to each other and spaced apart radially in the building, a floor in the building having an air space thereunder, means supporting said rows of tiers of cages above and in spaced relation to said floor, means moving said annular rows in different concentric paths about a single axis, a continuous service area comprising a floor extending from the innermost to the outermost annular row of cages, said service area having a floor in a plane lower than the floor of the building, a service unit located in said service area movable to positions in the area from which all the cages are accessible to said unit when said cages are moved in annular paths across said service area, means on the service unit supporting an operator, and means for raising and lowering the operator supporting means.

18. The poultry housing defined by claim 17, in which the service unit is provided with vertical food and water supply pipes mounted on the unit, each of said pipes having a plurality of delivery spouts equal to the number of cages in each tier and located to deliver food and water simultaneously to the cages of a tier when a row of tiers is moved across said service area past the service unit.

19. The poultry housing defined by claim 17, in which the service unit is provided with a vertical water supply pipe mounted on the unit and a plurality of brushes having hollow bodies communicating with said water supply pipe at different levels equal to the number of cages in a tier, said brushes being slightly upwardly inclined from their connection to the supply pipe, and in which the cages are supplied with droppings pans downwardly inclined from rear to front, said brushes being positioned to simultaneously enter the droppings pans of a tier of cages in pan cleaning positions when a row of tiers is moved across said service area past the service unit.

20. The poultry housing defined by claim 17, in which the service unit is provided with egg collection trays at different levels convenient to the levels of the floors of the cages of a tier, and a conveyor adjacent said trays for receiving eggs from the trays at different levels.

21. Poultry housing comprising a building, a floor in the building having an air space thereunder, a central tower, a plurality of cages arranged in tiers connected to gether to form a plurality of rows of tiers, said rows having different diameters and being located concentrically relatively to each other and spaced apart radially in the building around said tower, each of said annular rows having ends spaced from each other, means connecting the rows of cages to the tower in spaced relation to the floor, radially extending beams connected to the cages of the several rows, means on the tower and beams rotating the beams and tiers of cages about a single axis, the spaces between the ends of the annular rows of cages when aligned radially forming a continuous service area extending from the innermost to the outermost row of cages, a service unit located in said service area movable to positions in the area from which all the cages are accessible to said unit when said rows of cages are moved in annular paths across said service area, an operator's support on the service unit, a food supply pipe and a water supply pipe at each side of the operator's support, each of said pipes having delivery spouts at different levels for simultaneous delivery of food and water to the cages of facing tiers of cages in two annular rows, a wash water supply pipe at each side of the operator's support, a plurality of brushes connected to the wash water pipes at different levels for simultaneous entry into droppings pans beneath the cages of facing tiers of cages in two annular rows for cleansing said pans when the rows of tiers are rotated past the service unit, a plurality of gutters each located at an angle to a brush on the service unit to underlie the forward portion of a droppings pan, a drain in each gutter conveying waste material to the floor of the service area, the floor of the service area being in a plane lower than the floor of the building, and egg collection trays at different levels on the service unit convenient to the cages of facing tiers of two annular rows when said rows of cages are moved in annular paths across said service area.

References Cited in the file of this patent

UNITED STATES PATENTS

| | | |
|---|---|---|
| 406,248 | Williams | July 2, 1889 |
| 2,257,734 | Cornell | Oct. 7, 1941 |
| 2,311,640 | Cornell | Feb. 23, 1943 |
| 2,314,344 | Cornell | Mar. 23, 1943 |
| 2,369,316 | Scott | Feb. 13, 1945 |
| 2,698,599 | Kalmoe | Jan. 4, 1955 |
| 2,735,400 | Stubbs | Feb. 21, 1956 |
| 2,886,001 | Kitson | May 12, 1959 |